(12) United States Patent
Junig et al.

(10) Patent No.: US 8,016,706 B2
(45) Date of Patent: Sep. 13, 2011

(54) PLATE-LINK CHAIN

(75) Inventors: Marcus Junig, Bühlertal (DE); Anton Simonov, Bühl (DE); Olga Ispolatova, Bühl (DE); Michael Pichura, Bühl (DE); Martin Vornehm, Bühl (DE); Aurel Vietoris, Bühl (DE)

(73) Assignee: LuK Lamellen und Kupplungsbau Beteiligungs KG, Böhl (DE)

( * ) Notice: Subject to any disclaimer, the term of this patent is extended or adjusted under 35 U.S.C. 154(b) by 11 days.

(21) Appl. No.: 11/646,197

(22) Filed: Dec. 26, 2006

(65) Prior Publication Data

US 2007/0197332 A1 Aug. 23, 2007

Related U.S. Application Data

(60) Provisional application No. 60/755,968, filed on Jan. 3, 2006.

(30) Foreign Application Priority Data

Dec. 24, 2005 (DE) .......................... 10 2005 062 311

(51) Int. Cl.
*F16G 13/04* (2006.01)

(52) U.S. Cl. ........ 474/215; 474/157; 474/201; 474/206; 474/212; 474/213; 474/217; 474/219; 474/226; 474/228; 474/230; 474/245

(58) Field of Classification Search ................... 474/213, 474/212, 214–220, 226–230, 201, 157; *F16G 13/00, F16G 13/02, 13/04, 13/06, 13/07, 13/08*
See application file for complete search history.

(56) References Cited

U.S. PATENT DOCUMENTS

| 601,748 | A | * | 4/1898 | Dundas et al. | 474/212 |
|---|---|---|---|---|---|
| 1,119,582 | A | * | 12/1914 | Dodge | 474/213 |
| 1,259,028 | A | * | 3/1918 | Layman | 474/157 |
| 1,734,688 | A | * | 11/1929 | Morse | 474/213 |
| 1,780,040 | A | * | 10/1930 | Pierce | 474/217 |
| 1,952,885 | A | * | 3/1934 | Oakes | 474/213 |
| 1,995,112 | A | * | 3/1935 | Belcher | 474/213 |
| 3,916,709 | A | * | 11/1975 | Steuer et al. | 474/242 |
| 4,504,255 | A | * | 3/1985 | Rattunde | 474/201 |
| 4,710,154 | A | * | 12/1987 | Rattunde | 474/242 |
| 5,288,278 | A | * | 2/1994 | Nagano | 474/228 |
| 6,890,278 | B2 | * | 5/2005 | Prince | 474/206 |
| 2005/0159261 | A1 | * | 7/2005 | Christmas | 474/219 |

* cited by examiner

*Primary Examiner* — Robert Siconolfi
*Assistant Examiner* — San Aung
(74) *Attorney, Agent, or Firm* — Alfred J. Mangels

(57) ABSTRACT

A plate-link chain composed of a plurality of plates that form plate sets, which are connected to an adjacent plate set with a hinge joint. At least some of the plates have a stopping means that limits bending of the plate-link chain in a direction opposite to the bend direction the chain undergoes when it passes over and around a pulley or a gear with which the chain comes into contacting engagement when the pulley or gear rotates.

4 Claims, 6 Drawing Sheets

PLATE-LINK CHAIN

BACKGROUND OF THE INVENTION

1. Field of the Invention

The present invention relates to a plate-link chain composed of a plurality of plates that form plate sets, which are connected to adjacent plate sets with a hinge joint.

2. Description of the Related Art

Plate-link chains are used in transmissions, for example those having continuously variable transmission ratio properties (a continuously variable transmission or CVT). The chain is positioned between pulleys in the form of pairs of conical disks having a variable spacing between the disks of a disk pair, or as a toothed plate-link chain in combination with gears. Chain strand vibrations arise through the effects of forces acting on the chain links as the chain runs onto or off of a sprocket in the toothed plate-link chain transmission, or onto or off a pulley in a CVT transmission. Strand vibrations here mean transverse vibrations of the chain between the pulleys or sprockets. The impacts of the tooth flanks in a toothed plate-link chain in combination with the polygon effect of the link chain excites the chain strand to vibration. A similar thing happens with plate-link chains in CVT transmissions between the rocker member faces and the pulleys. As a result of the entry impulses as the toothed plates enter as a toothed plate-link chain meshes with the gear, vibrations can occur which can reach various frequencies, depending upon the speed of the chain. Such vibrations can have a negative effect on the acoustic behavior of such a chain drive. To prevent those unwanted effects on the acoustic behavior of the transmission, it is possible to install within the transmission additional remedial measures, such as, for example, sliding rails or damping elements. Such measures require additional construction space, however, and also increase the production costs.

Reducing chain strand vibrations by applying measures to the chains is known. For example, U.S. Pat. No. 1,780,040 describes a toothed plate with a right-angle bend on the back. That arrangement blocks the vibration of the chain in one direction. The plate can also be designed as a guide plate. A disadvantage of that solution is the very stiff implementation of the plates, especially in the back region, which results in an increase in the plate rigidity and as a consequence an increase in the tensile stresses at the openings in the plate that receive the hinge pins. An additional disadvantage is the increased construction space required by the chain because of the offset bend, and expensive production costs for the individual plates.

One object of the present invention is to provide plate-link chains that are simple and inexpensive to produce, and that also reduce chain strand vibrations. Another object is to provide a plate-link chain that allows additional damping measures such as sliding rails or damping elements to be dispensed with, so that the requisite construction space and the costs of producing a transmission can be reduced.

SUMMARY OF THE INVENTION

The object is achieved by a plate-link chain made of a plurality of plates that form plate sets that are connected to an adjacent plate set with a hinge joint, and wherein at least part of the plates have a stopping means that limits the bending of the plate-link chain around the hinge joint in one bending direction. Preferably, the bending of the plate-link chain in the direction opposite to the bending when encircling a sprocket or pulley is limited, so that the bending necessary for encircling is not limited. The plate-link chain can also be a toothed plate-link chain.

The stopping means can be a bend that abuts against the edge of an adjacent plate when the plate-link chain bends. Preferably there is provision for the plates provided with a stopping means to have an opening between the hinge joints.

Alternatively, the stopping means can include at least one lug that engages an opening of a guide plate. Another embodiment includes the provision that the stopping means is a side flank of the plate. Another embodiment includes the provision that the hinge joint includes a pin and the stopping means includes a wing that abuts against a pin of an adjacent hinge joint when the plate-link chain bends. Another embodiment includes the provision that the stopping means is a bent wing of a plate that abuts against a pin of an adjacent hinge joint when the plate-link chain bends.

Preferably, there is a provision that in each case one rocker member of a hinge joint is connected to the plates of a plate set through an attachment opening, and two rocker members of adjacent plate sets form the hinge joint, where the rocker members can roll or slide on each other with a roller profile. Preferably there is a provision that plate sets include at least one guide plate. The guide plate can be located inside the plate set, but it can also be positioned at the outer ends of the plate set.

The object identified at the outset is also achieved by a plate with a feature for a plate-link chain of the chain in accordance with the invention, and a transmission having a plate-link chain in accordance with the invention. The transmission can be a gear transmission or a transmission with variable transmission ratio, in particular a CVT transmission. Correspondingly, the plate-link chain can also be a toothed plate-link chain. A toothed plate-link chain usually has guide plates.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 21:
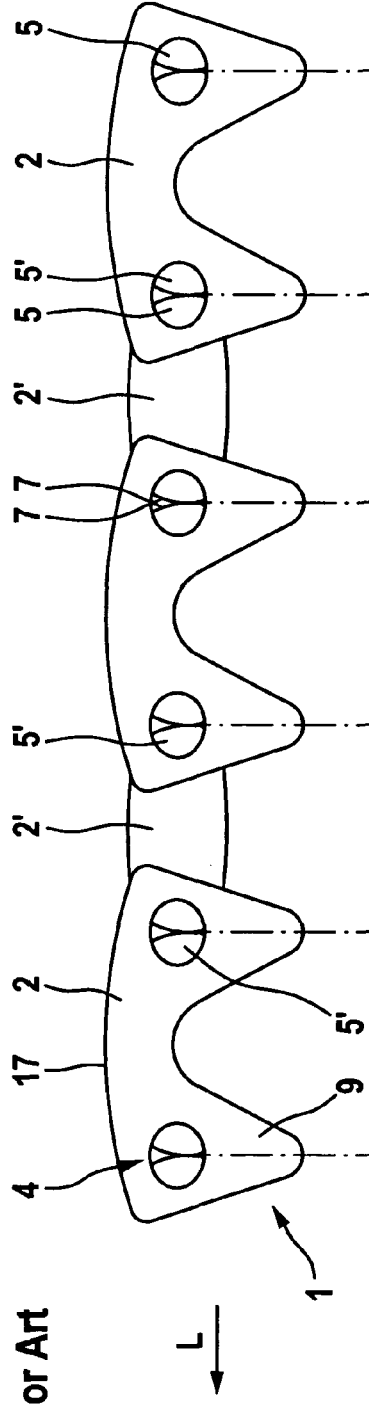
FIG. 21 is a side view of a known toothed plate-link chain.
Figure 22:
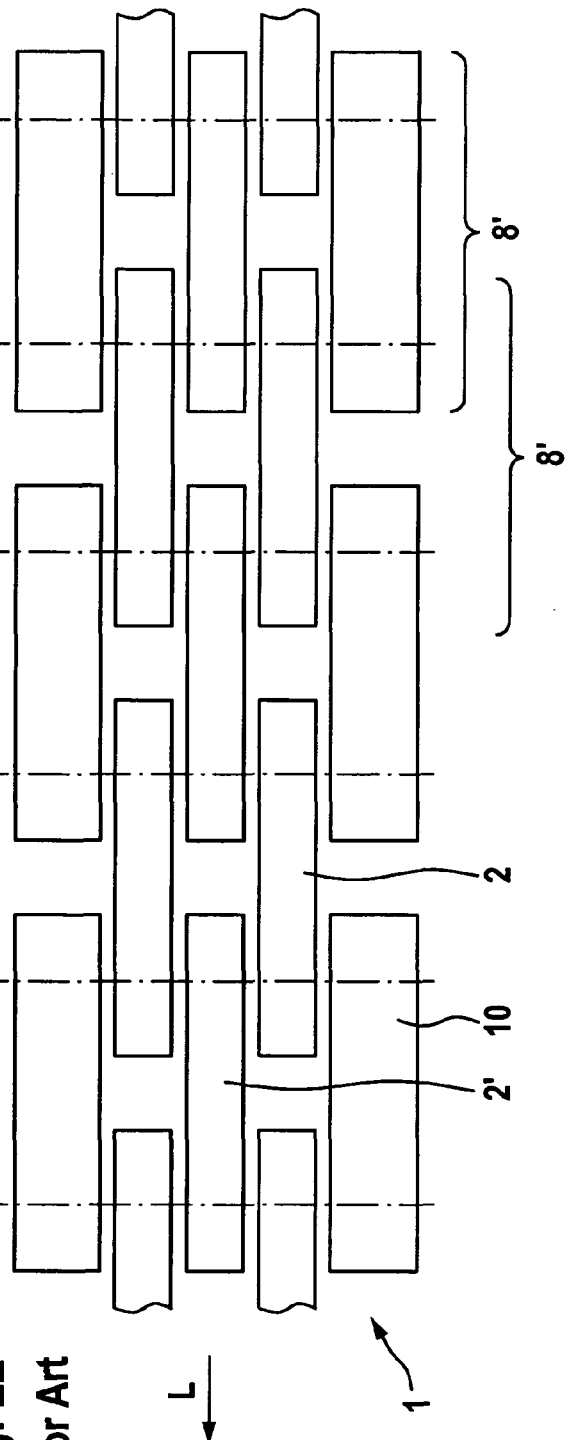
FIG. 22 is a top view of the toothed plate-link chain of FIG. 21.

FIG. 21 shows a side view and FIG. 22 a top view of a plate link chain 1 in accordance with the state of the art, with a two-plate connection. The basic construction of plate-link chains and toothed plate-link chains and the terms used in describing the exemplary embodiments in accordance with the invention will be explained on the basis of the structures shown in FIGS. 21 and 22. The exemplary embodiments will be described using the example of a plate-link chain having a two-plate connection, but they are equally applicable to a plate-link chain having a three-plate connection.

Plate link chain 1 includes a large number of plates 2 and opposed plates 2'. Plates 2 and opposed plates 2' are arranged alternately, in a transverse direction of chain 1, and are combined into a hinge joint with hinge joint pins 4. Consequently both ends of a plate 2 are connected to one or two opposed plates 2' by means of a hinge joint, and, correspondingly, both ends of an opposed plate 2' are connected to one or two plates 2 by a hinge joint.

The hinge joint pins 4 can be in one piece, but are preferably in two pieces, with a rocker member 5 being associated with each of the plates 2 and rolling on a rocker member 5' associated with the opposed plate 2. In addition, rocker members 5, 5' each have a roller profile 7 and 7' respectively, with which they can roll on or slide against each other. The roller profiles 7, 7' can be identical or different.

The plates 2 and opposed plates 2' are stacked transversely to the chain running direction L (that is identified by an arrow with the reference label L), so that an overlapping opposed plate 2' is positioned between two hinge joint pins 4 that are arranged side-by-side and perpendicular to the running direction L. Similarly, a plate 2 is positioned between and overlaps two opposed plates 2' that are side by side transversely, relative to the running direction. Of course, that does not apply to the plates 2 or opposed plates 2' that are located on the outside, transversely to the running direction 2, which have a neighboring plate on only one side.

The sets of plates 2 formed as described above (also referred to as plate stacks) form a chain link 8 by sets. Correspondingly, the sets of opposed plates 2' form a chain link 8' by sets. In the illustrated example the plates 2 and opposed plates 2' can be identically formed parts, a differentiation between plates 2 and opposed plates 2' being recognizable only by the arrangement in the chain. The following description will therefore only refer to plates 2, because they are identical to the opposed plates 2' except for the arrangement in sets. FIG. 22 shows a plate set of three plates 2 and two opposed plates 2'; but it is also possible to provide plate sets with any other number of plates 2 and opposed plates 2'.

In the case of a toothed plate-link chain, the plates 2 are each provided with plate teeth 9, as can be seen in FIG. 21. In the case of a plate-link chain for use in a CVT transmission, for example, the plate teeth 9 are not present. With the plate teeth 9, plate link chain 1 can mesh with a toothed part, for example a gear. The spacing between plates 2 and opposed plates 2' is such that when the chain is extended a uniform spacing results overall between plate teeth 9. The opposed plates 2' are also provided with plate teeth 9, so that all of the plates and opposed plates are provided with plate teeth 9. But it is likewise also possible to provide either only plates 2 or opposed plates 2' with two plate teeth 9, or to provide plates 2 and opposed plates 2' each with only one plate tooth 9. The plate sets are closed on both sides by guide plates 10.

Figure 1:
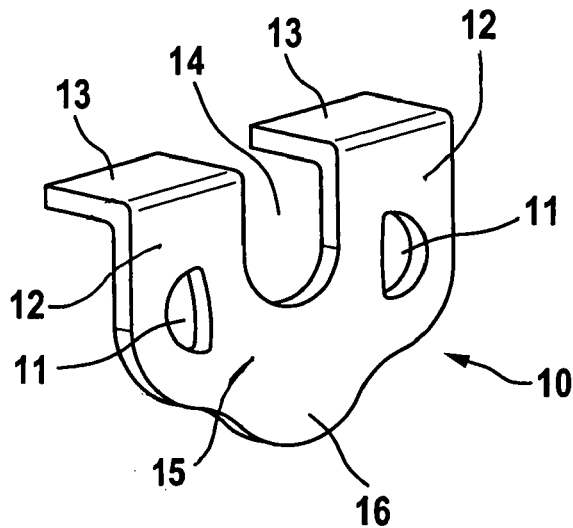
FIG. 1 is a perspective view of a first embodiment of a guide plate in accordance with the invention.

FIG. 1 shows an embodiment of a guide plate 10 in accordance with the invention with receiving openings 11 for receiving rocker members 5, 5'. The guide plates 10 include a main body 15 having upstanding legs 12, on each of the outer ends of which there is provided a bent end 13. Between the receiving openings 11 an opening 14 is formed in main body 15, which also includes a downwardly-extending lobe 16 facing away from legs 12.

Figure 2:
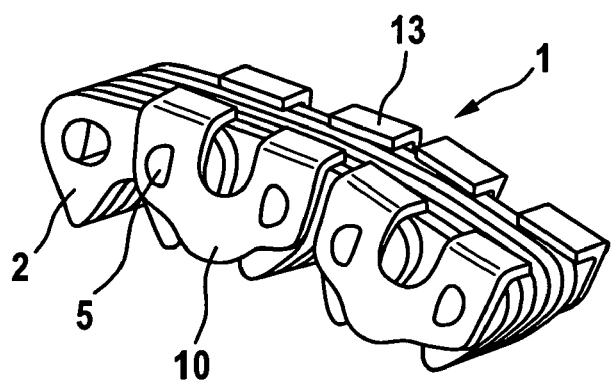
FIG. 2 is a perspective view of a portion of a toothed plate-link chain with a guide plate in accordance with FIG. 1.
Figure 3:
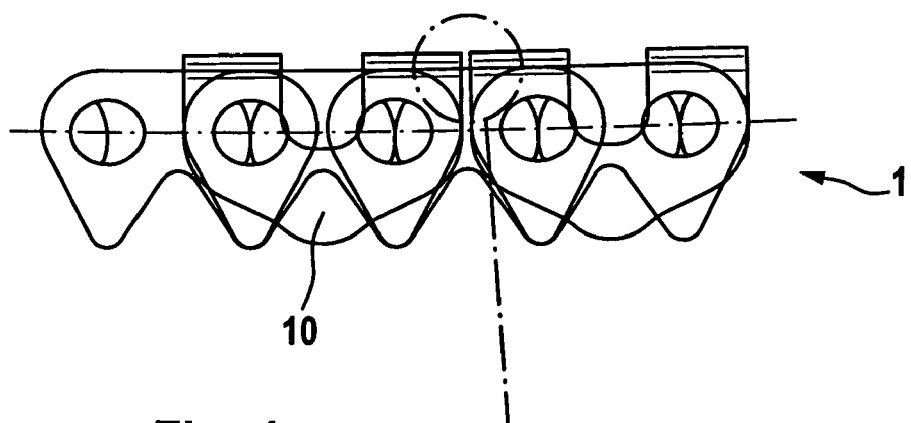
FIG. 3 is a side view of a toothed plate-link chain in accordance with FIG. 2.
Figure 4:
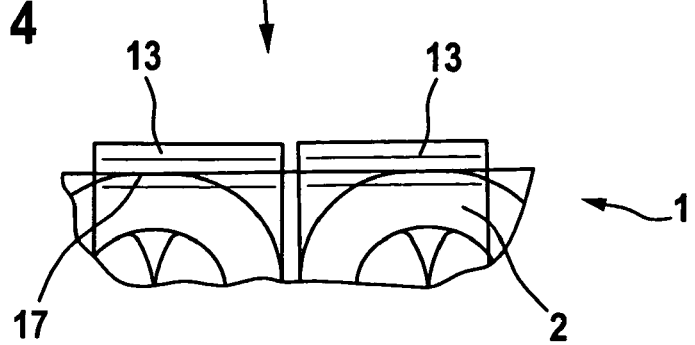
FIG. 4 is an enlarged detail of a portion of FIG. 3.

FIG. 2 shows guide plate 10 in accordance with the invention installed in a plate link chain 1. Guide plate 10 is part of a plate set 8 or 8', as was described relative to FIGS. 21 and 22, and is firmly connected to the associated rocker members 5, 5'. FIG. 3 shows a portion of toothed plate-link chain 1 in a side view and in a bowed or bent position, in which the bend is away from the teeth. As shown in FIG. 4, the undersides of bent ends 13 are resting on the plate top 17 of an adjacent plate 2.

Figure 5:
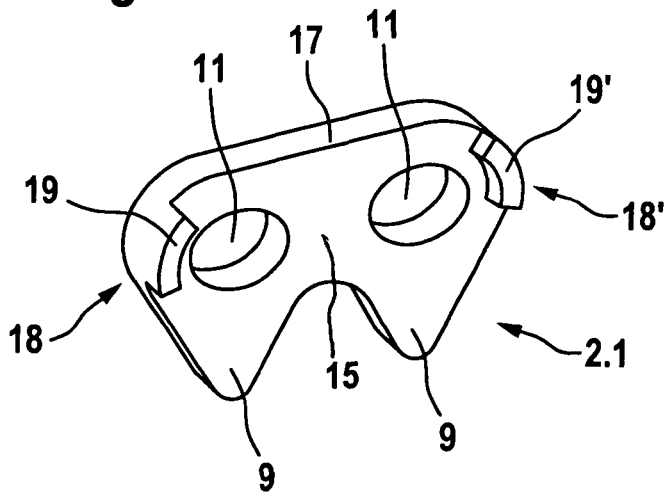
FIG. 5 is a first exemplary embodiment of a toothed plate in accordance with the invention.

FIG. 5 shows a first exemplary embodiment of a toothed plate 2.1 in accordance with the invention. The main body 15 of toothed plate 2.1 includes receiving openings 11 for pairs of both interacting rocker members 5, 5' of two different plate sets. Positioned at each of the ends 18 and 18' are lugs 19 and 19', which extend from the main body 15 laterally in reference to the running direction L of the chain.

Figure 6:
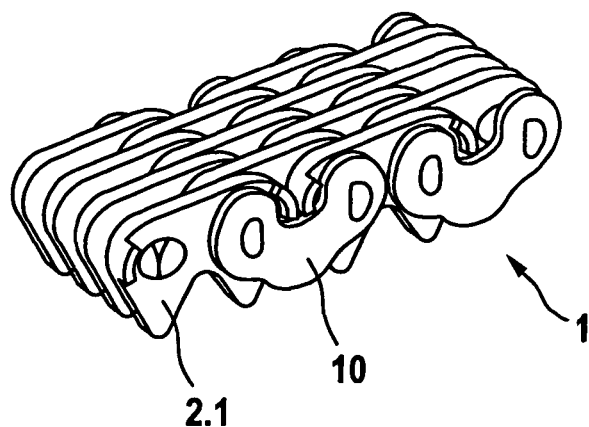
FIG. 6 is a perspective view of a portion of a toothed plate-link chain including a toothed plate in accordance with FIG. 5.

FIG. 6 shows a detail of a plate-link chain with a toothed plate 2.1 in accordance with FIG. 5. The series of toothed plates 2.1 positioned one after the other in the running direction L of the chain are positioned immediately beside the series of guide plates 10. Lugs 19 and 19' each engage an opening comparable to the opening 14 in guide plates 10 shown in FIG. 1.

Figure 7:
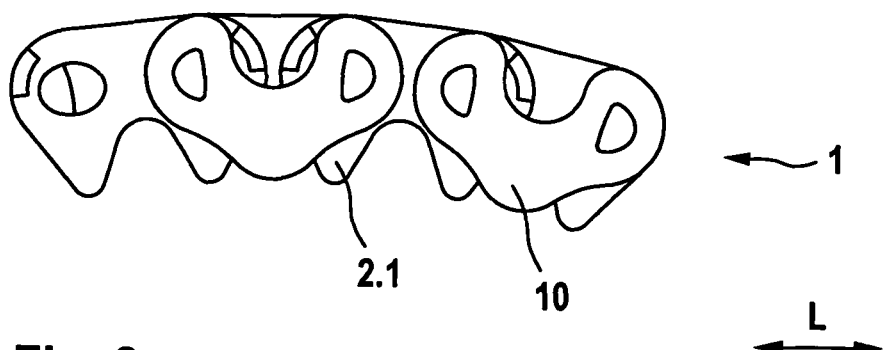
FIG. 7 is a toothed plate-link chain with a toothed plate in accordance with FIG. 5 in a first bent position.
Figure 8:
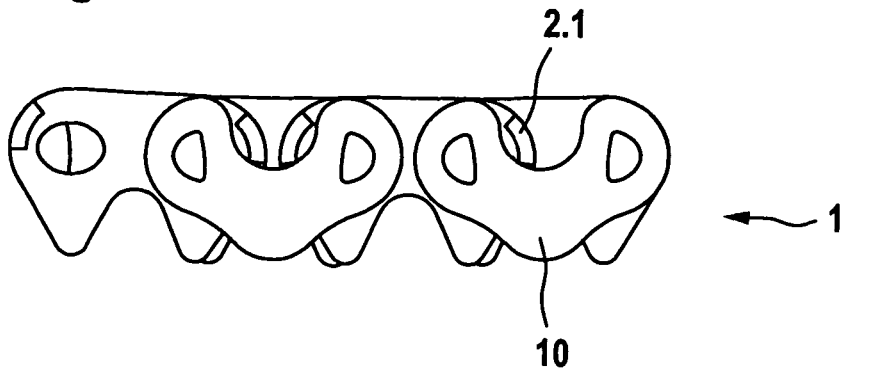
FIG. 8 is a side-view of a toothed plate-link chain in accordance with FIG. 7 in a second bent position.

FIG. 7 shows a bent position of a portion of toothed plate-link chain 1 in accordance with FIG. 6, with toothed plate-link chain 1 bent in the direction of the teeth. In that position the lugs 19 do not contact guide plate 10. FIG. 8 shows a position of the toothed plate link chain in accordance with FIG. 7 bent in the opposite direction, hence in the direction of the plate top 17. In that position the lugs 19 contact opening 14 of the guide plates and thus prevent further bending.

Figure 9:
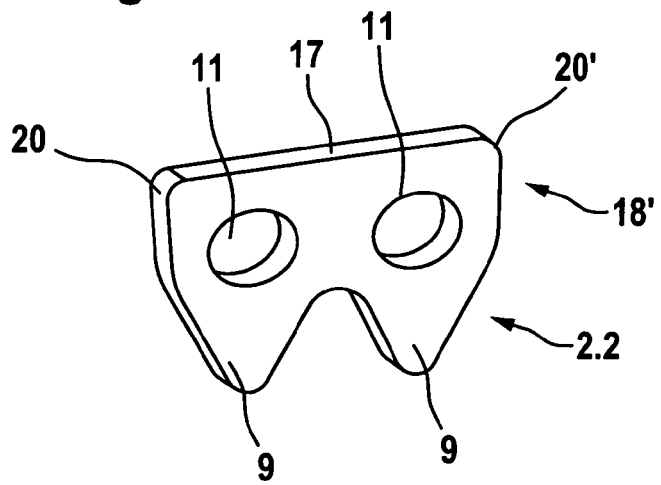
FIG. 9 is a second exemplary embodiment of a toothed plate in accordance with the invention.
Figure 10:
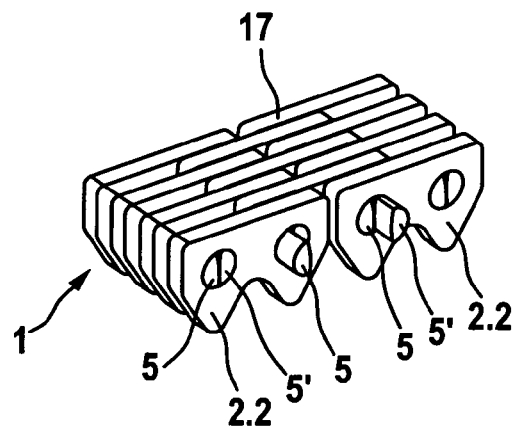
FIG. 10 is a perspective view of a portion of a toothed plate-link chain including toothed plates in accordance with FIG. 9.
Figure 11:
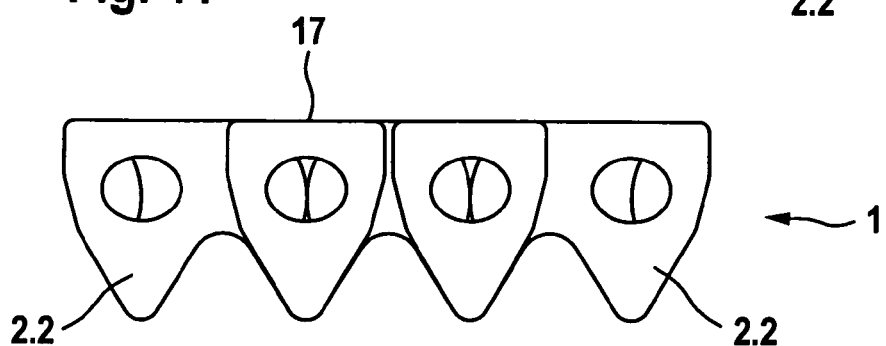
FIG. 11 is a side view of a portion of a toothed plate-link chain in accordance with FIG. 10 in an extended position.
Figure 12:
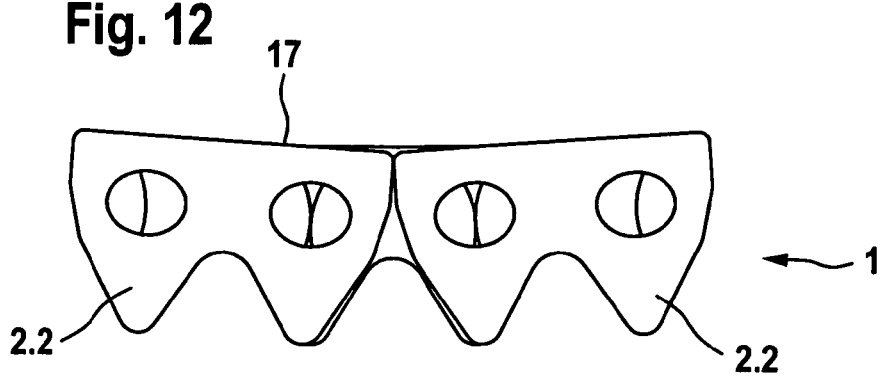
FIG. 12 is the chain of FIG. 11 in a bent position of the toothed plate-link chain.

FIG. 9 shows a second exemplary embodiment of a toothed plate 2.2 in accordance with the invention. Toothed plate 2.2 will be described only in terms of the differences from the embodiment shown in FIG. 5. Instead of a lug 19 or 19', toothed plate 2.2 has end flanks 20 and 20'. FIG. 10 shows a portion of a plate-link chain 1 with toothed plates 2.2 in accordance with FIG. 9. The manner of operation of the end flanks is illustrated in FIGS. 11 and 12. FIG. 11 shows the straight position of the chain, while FIG. 12 shows the chain in a bent position with bending in the direction of the plate tops 17. In the position in accordance with FIG. 12, the end flanks 20 and 20' of adjacent toothed plates contact each other and thus prevent further bending of plate-link chain 1.

Figure 13:
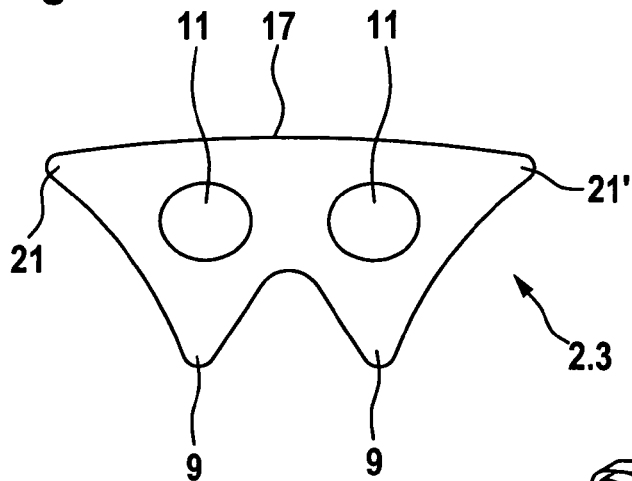
FIG. 13 is a side view of a third exemplary embodiment of a toothed plate in accordance with the invention.
Figure 14:
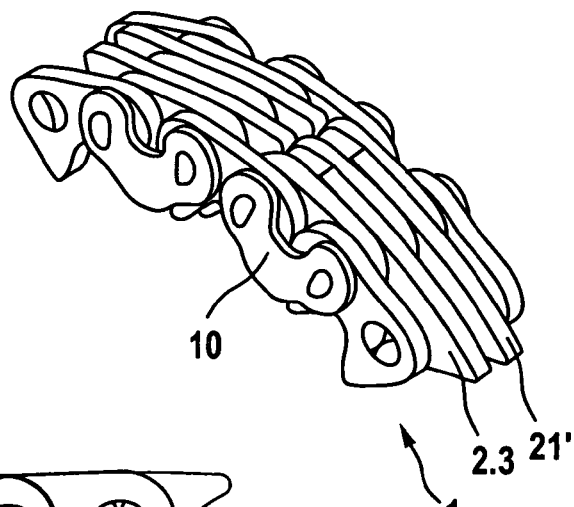
FIG. 14 is a perspective view of a portion of a toothed plate-link chain including toothed plates in accordance with FIG. 13.
Figure 15:
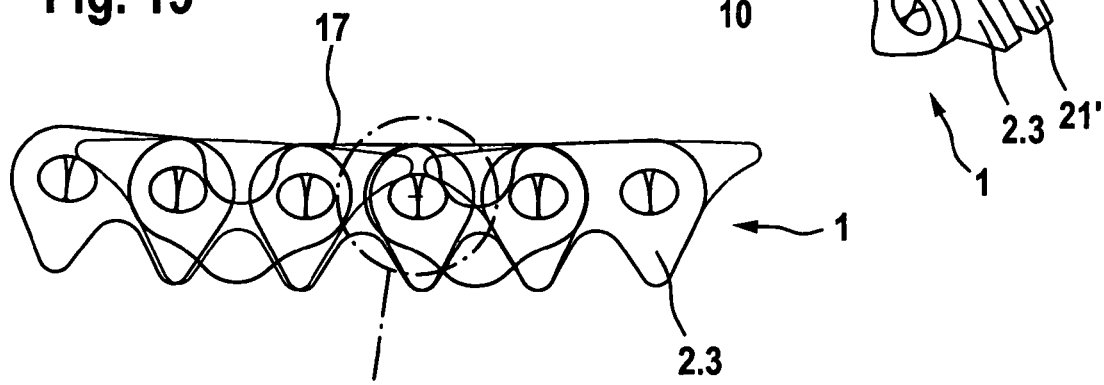
FIG. 15 is a side view of the toothed plate-link chain of FIG. 14 in a bent condition.
Figure 16:
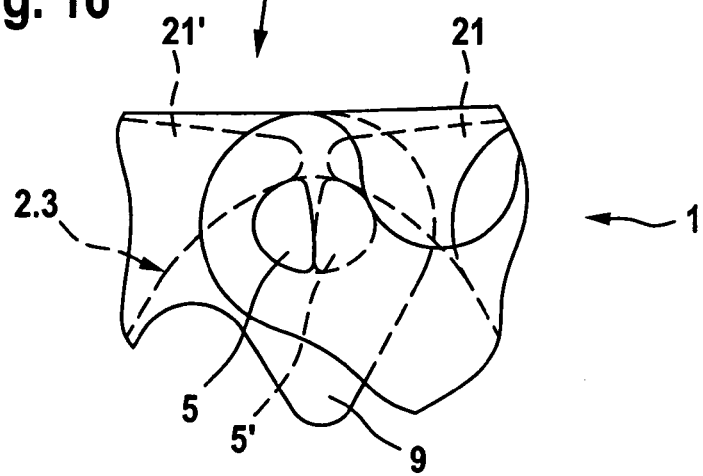
FIG. 16 is an enlarged detail of a portion of FIG. 15.

FIG. 13 shows a third embodiment of a toothed plate 2.3 in accordance with the invention. Wings 21 and 21' extending in the running direction L of the chain are provided as a bend stopping means. Wings 21 and 21' abut against adjacent pins 4 or rocker members 5, 5' when plate-link chain 1 bends. FIG. 14 shows a portion of a plate-link chain 1 with toothed plates 2.3 in accordance with the invention. Toothed plates 2.3 are positioned within the group of plates in such a way that in the longitudinal series of plates in which the toothed plates 2.3 are positioned, a pin 4 or a combination of rocker members 5 and 5' (which can be referred to collectively as pin 4 in accordance with FIG. 1) that extend through other adjacent plates do not pas through toothed plates 2.3. Wings 21 and 21' can abut rocker members 5, 5' when toothed plate-link chain 1 bends in accordance with the illustration in FIG. 15. FIG. 16 shows how the wings 21 and 21' of adjacent toothed plates 2.3 abut against adjacent rocker members 5, 5' when toothed plate-link chain 1 bends.

Figure 17:
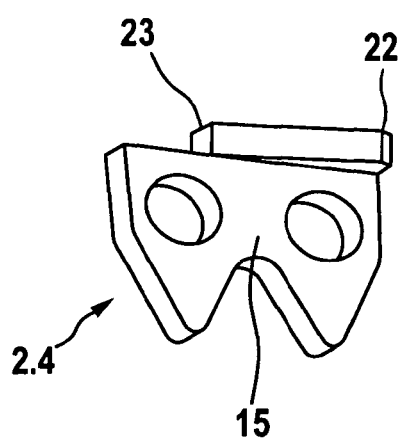
FIG. 17 is perspective rear view of a fourth exemplary embodiment of a toothed plate in accordance with the invention.
Figure 18:
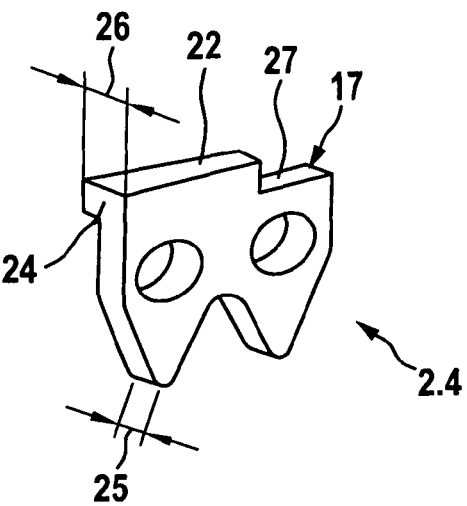
FIG. 18 is a perspective front view of the toothed plate shown in FIG. 17.
Figure 19:
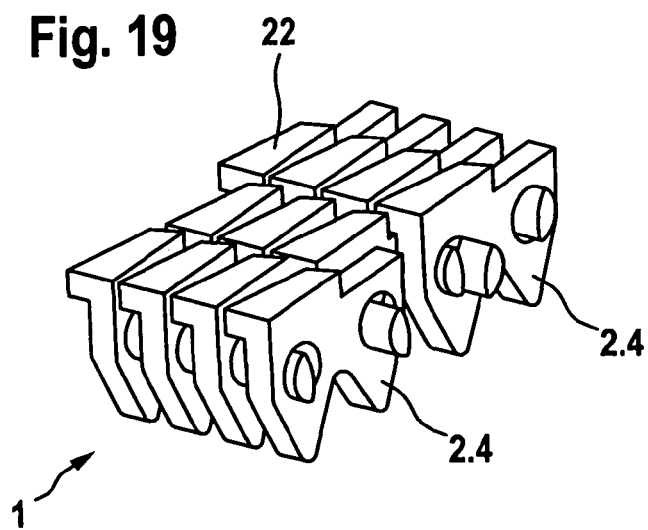
FIG. 19 is a perspective view of a toothed plate-link chain including toothed plates in accordance with FIGS. 17 and 18.
Figure 20:
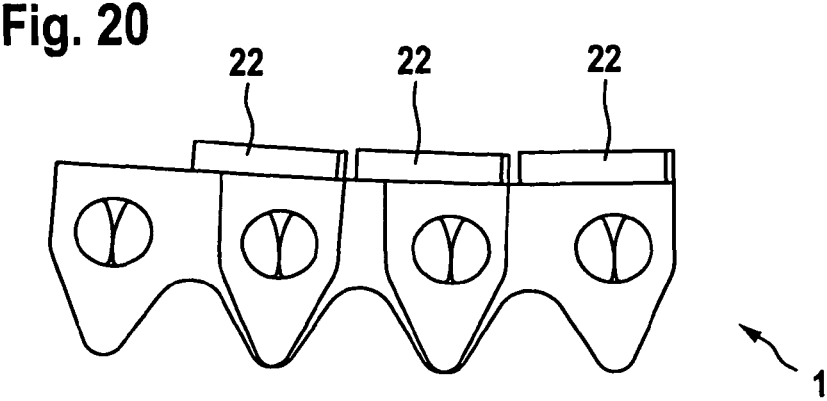
FIG. 20 is a side view detail of toothed plate-link chain of FIG. 19 in a bent position.

FIGS. 17 and 18 show a fourth exemplary embodiment of a toothed plate 2.4 in accordance with the invention. A bent-over wing 22 is positioned at plate top 17 as a stopping means. Bent-over wing 22 extends over only part of the length of plate top 17, and it has a width at starting end 23 that has a width that corresponds to the width 25 of the main body 15 of toothed plate 2.4. On a contact face 24, bent-over wing 22 is wider than at starting end 23, so that its width 26 in the region of contact end 24 is greater than the width 25 of toothed plate 2.4. The region of plate top 17 that is not overlaid by bent-over wing 22 has a stopping surface 27 that can come into contact with the underside of a bent-over wing 22 of an adjacent toothed plate 2.4.at contact end 24. FIG. 19 shows a portion of a plate-link chain 1 with toothed plates 2.4 in accordance with FIGS. 17 and 18. Toothed plates 2.4 are all installed in toothed plate-link chain 1 in the same orientation. FIG. 20 illustrates the manner of operation of the stopping means of the toothed plate embodiment shown in FIGS. 17 and 18. If the toothed plate-link chain is bent in the direction of the plate top 17, the bent-over wings 22 strike the stopping surface 27 of the adjacent toothed plates.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain, said chain comprising: a plurality of link plates that form link plate sets that are connected by hinge pins to adjacent link plate sets, wherein at least a portion of the link plates include a stopping means that limits bending of the plate-link chain in a first bending direction that is opposite to a second bending direction that the chain undergoes when the chain passes around a circular component, at least one laterally outwardly mounted guide plate carried by the chain, the at least one guide plate including an upwardly-facing guide plate opening that faces the first chain bending direction, wherein the upwardly-facing guide plate opening is positioned between a pair of spaced hinge-pin-receiving openings in the at least one guide plate, wherein the stopping means includes on at least one inner link plate adjacent to the at least one guide plate at least one laterally-outwardly-extending lug that extends outwardly from a longitudinally-extending side surface of the at least one inner plate link, wherein the outwardly-extending lug is adjacent to a longitudinally outer end of the at least one inner link plate and is spaced outwardly from hinge-pin-receiving openings formed in the at least one inner link plate, wherein when the chain bends in the first bending direction the at least one laterally-outwardly-extending lug of the at least one inner link plates contacts the upwardly-facing guide plate opening of the at least one adjacent laterally-outwardly-mounted guide ,plate to limit further pivotal movement between the at least one guide plate and the at least one inner link plate in the first movement direction by contact of a surface of the at least one laterally-extending lug with a surface of the upwardly-facing guide plate opening of the at least one laterally-adjacent guide plate to limit bending of the chain in the first bending direction to thereby reduce chain strand vibrations.

2. A plate-link chain in accordance with claim 1, wherein the hinge pins include at least one rocker member that is connected to link plates of one link plate set through a rocker-member-receiving opening and two abutting rocker members of adjacent link plate sets form a hinge joint, wherein the two rocker members each include facing rolling surfaces at which the two abutting rocker members are in contacting engagement with each other.

3. A plate-link chain in accordance with claim 1, wherein each of the link plate sets includes at least one laterally-outwardly-mounted guide plate.

4. A transmission including a plate link chain, wherein the chain comprises: a plurality of link plates that form link plate sets that are connected by hinge pins to adjacent link plate sets, wherein at least a portion of the link plates include a stopping means that limits bending of the plate-link chain in a first bending direction that is opposite to a second bending direction that the chain undergoes when the chain passes around a circular component, at least one laterally outwardly mounted guide plate carried by the chain, the at least one guide plate including an upwardly-facing guide plate opening that faces the first chain bending direction, wherein-the upwardly-facing guide plate opening is positioned between a pair of spaced hinge-pin-receiving openings in the at least one guide plate, wherein the stopping means includes on at least one inner link plate adjacent to the at least one guide plate at least one laterally-outwardly-extending lug that extends outwardly from a longitudinally-extending side surface of the at least one inner plate link, wherein the outwardly-extending lug is adjacent to a longitudinally outer end of the at least one inner link plate and is spaced outwardly from hinge-pin-receiving openings formed in the at least one inner link plate, wherein when the chain bends in the first bending direction the at least one laterally-outwardly-extending lug of the at least one inner link plates contacts the upwardly-facing guide plate opening of the at least one adjacent laterally-outwardly-mounted guide plate to limit further pivotal movement between the at least one guide plate and the at least one inner link plate in the first movement direction by contact of a surface of the at least one laterally-extending lug with a surface of the upwardly-facing guide plate opening of the at least one laterally-adjacent guide plate to limit bending of the chain in the first bending direction to thereby reduce chain strand vibrations.

* * * * *